J. A. DRAKE.
POWER TRANSMISSION DEVICE.
APPLICATION FILED APR. 8, 1918.
1,293,732.
Patented Feb. 11, 1919.
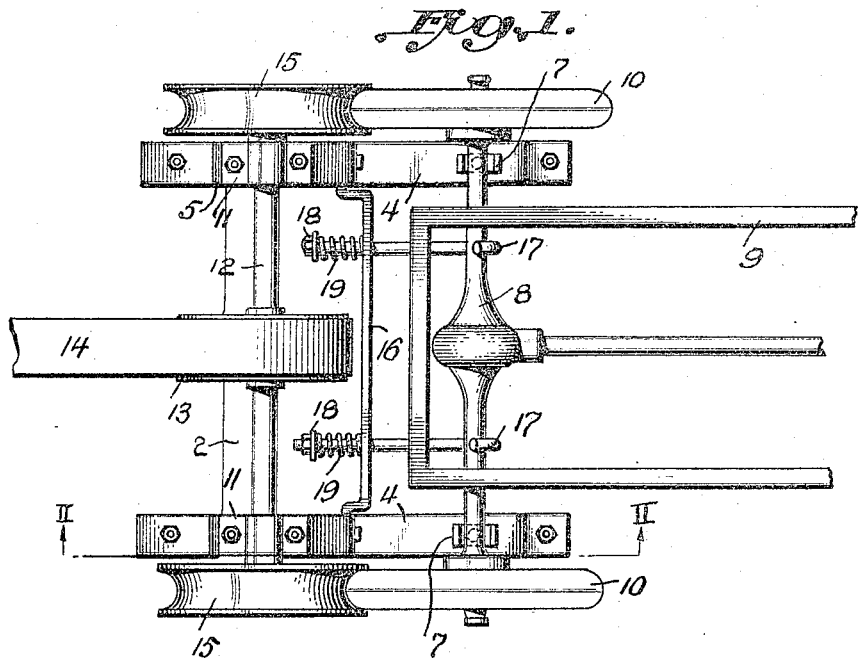
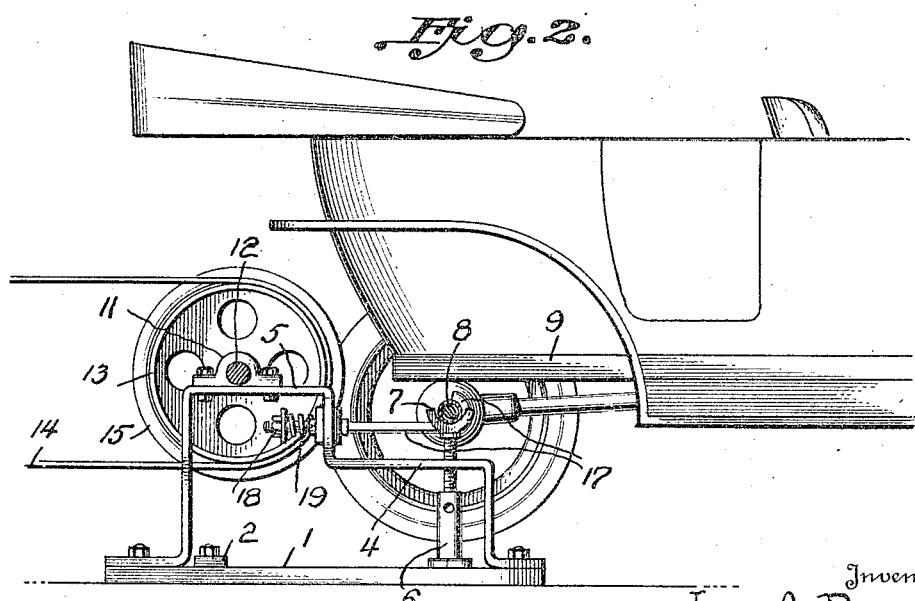
Inventor
JOHN A. DRAKE,
By
Attorneys

UNITED STATES PATENT OFFICE.

JOHN A. DRAKE, OF DETROIT, MICHIGAN, ASSIGNOR OF ONE-HALF TO ERWIN E. EVELETH, OF CORONA, MICHIGAN.

POWER-TRANSMISSION DEVICE.

1,293,732.

Specification of Letters Patent.

Patented Feb. 11, 1919.

Application filed April 8, 1918. Serial No. 227,165.

*To all whom it may concern:*

Be it known that I, JOHN A. DRAKE, a citizen of the United States of America, residing at Detroit, in the county of Wayne and State of Michigan, have invented certain new and useful Improvements in Power-Transmission Devices, of which the following is a specification, reference being had therein to the accompanying drawings.

This invention relates to a power transmission device by which the power of an automobile, truck or self-propelled vehicle may be utilized for operating stationary machinery and various kinds of devices, particularly the machinery and devices to be found about a farm.

My invention aims to provide a power transmission device on which the rear end of a self propelled vehicle may be placed and the rear axle of the vehicle elevated so that the vehicle may be operated with the rear driven wheels thereof off the ground, and the device includes novel means for deriving power from the rear driven wheels of the vehicle.

My invention further aims to provide a simple, durable and inexpensive device of the above type that can be readily transported from one place to another and quickly positioned relative to the rear axle of a vehicle and the machinery to be driven so that the power of the vehicle may be utilized for various purposes.

My invention will be hereinafter specifically described and then claimed, and reference will now be had to the drawing wherein—

Figure 1 is a plan of the power transmission device, and

Fig. 2 is a longitudinal sectional view of the same, taken on the line II—II of Fig. 1.

In the drawings, the reference numerals 1, denote baseboards or members connected by a transverse member 2 and mounted on the base members 1 are stepped frames 3 having low stepped portions 4 and high stepped portions 5.

On the base members 1, below the low stepped portions 4 of the frames 3 and extending therethrough, are screw jacks 6, having heads 7 that may be elevated into engagement with the rear axle housing 8 of an automobile 9 or other motor driven vehicle. The automobile 9 is of a conventional form wherein the rear axle housing 8 has driven wheels 10 at the ends thereof and these wheels are ordinarily provided with pneumatic tires.

On the high stepped portions 5 of the frames 3 are bearings 11 for a transverse revoluble shaft 12. Intermediate the ends of the shaft 12, is a pulley or belt wheel 13, over which may be trained a belt or flexible power transmitting member 14, so that power may be transmitted from the shaft 12 to machinery in proximity to the device.

On the ends of the shaft 12, are grooved wheels 15 and the wheels 10 of the automobile 9 are adapted to frictionally engage said wheels and transmit a rotary motion to the shaft 12.

Connecting the frames 3, between the low and high stepped portions 4 and 5 respectively thereof is a transverse support 16, and slidable in said support are hook shaped members 17 adapted to have the hook shaped ends thereof engage the rear axle housing 8, as best shown in Fig. 1. The opposite ends of the hook shaped members 17 have adjustable nuts 18 and coiled retractile springs 19, said spring encircling the hook shaped members 17, between the supporting member 16 and the nuts 18, so that said springs will always tend to draw the hook shaped members 17 rearwardly and thus maintain the wheels 10 in frictional engagement with the grooved wheels 15. The elements 16 to 19 inclusive constitute means for maintaining frictional contact between the wheels 10 and 15 and in this manner there will be a positive drive between the driven rear axle of the automobile and the shaft 12.

With the hook shaped members 17 loose in the supporting member 16, the hook shaped ends of said members may be lowered and with the jacks 6 lowered, the automobile 9 may be backed over the forward end of the power transmission device. The jacks 6 may be elevated to raise the wheels 10 off of the ground and then the hook shaped members 17 connected to the rear axle housing and the nuts 18 adjusted, so as to establish a driving relation between the wheels 10 and 15.

The heads 7 of the jacks 6 permit of the rear axle housing 8 shifting thereon, particularly as the hook shaped members 17 are tightened.

It is thought that the operation and utility of the device will be apparent without further description and while in the drawing there is illustrated a preferred embodiment of my invention, it is to be understood that the structural elements are susceptible to such variations and modifications as fall within the scope of the appended claim.

What I claim is:—

In a power transmission device, the combination with a driven vehicle axle having wheels, of frames, having high and low stepped portions, a revoluble shaft on the high stepped portions of said frames provided with a power transmission wheel, wheels at the ends of said shaft adapted to be frictionally engaged by the driven wheels of said vehicle axle, jacks under the low stepped portions of said frames and extending therethrough adapted for elevating the rear axle of the automobile to place the driven wheels of the automobile in engagement with the wheels of said shaft, a supporting member connecting said frames, hook shaped members loose in said supporting member and engaging the vehicle axle, and means on said hook shaped members engaging said supporting member and adapted to maintain the wheels of the vehicle axle in frictional engagement with the wheels of said shaft.

In testimony whereof I affix my signature in the presence of two witnesses.

JOHN A. DRAKE.

Witnesses:
KARL H. BUTLER,
ANNA M. DORR.